April 10, 1951 P. L. GILL 2,547,934
INDUCTION HEATER FOR AXIAL FLOW AIR COMPRESSORS
Filed June 9, 1948 2 Sheets-Sheet 1

INVENTOR.
PETER L. GILL
BY Wade Koontz
ATTORNEY and
Charles L. Burgoyne
AGENT

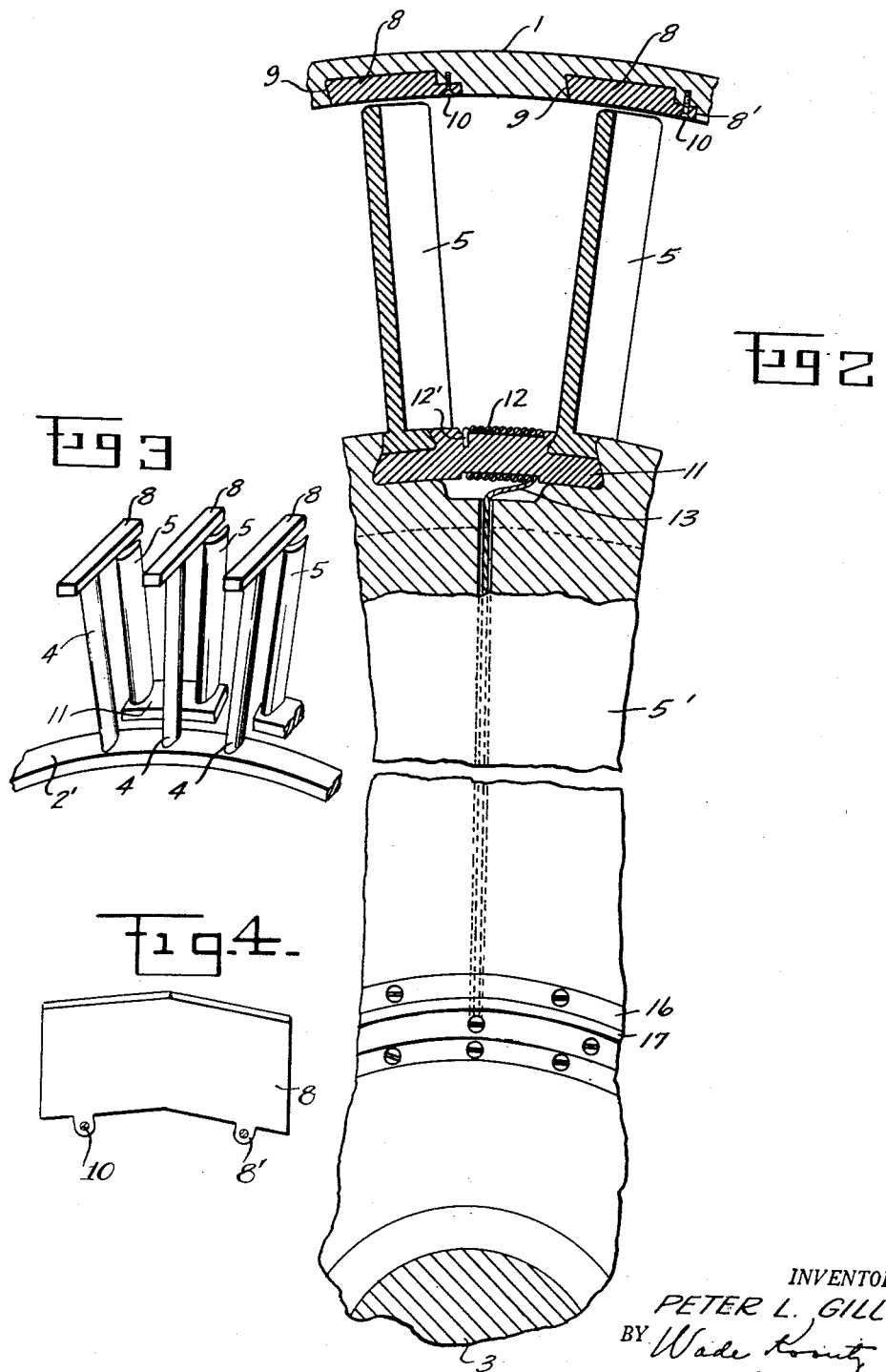

Patented Apr. 10, 1951

2,547,934

UNITED STATES PATENT OFFICE 2,547,934

INDUCTION HEATER FOR AXIAL FLOW AIR COMPRESSORS

Peter L. Gill, Osborn, Ohio

Application June 9, 1948, Serial No. 31,973

8 Claims. (Cl. 230—122)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an induction heater for axial flow air compressors making use of electromagnetic induction to produce eddy currents in the parts to be heated.

The primary object of the invention is to provide a simple and reliable arrangement for electrically heating the blades of an axial flow air compressor, particularly for a compressor as employed on a turbojet aircraft engine.

A further object of the invention is to provide an axial flow air compressor having a first row of rotor blades which are adapted to be magnetized and by their proximity to the first row of stator blades are adapted to effect an alternating magnetic flux in the stator blades and thus produce eddy currents therein having a heating effect on the blades.

Another object of the invention is to provide induction heating means for the blades of an axial flow air compressor to avoid icing up of the blades in cold weather or at high altitudes and to provide such heating means without materially altering the construction of the air compressor.

Another object of the invention is to generally improve and extend the field of usefulness of anti-icing equipment as used on aircraft.

The above and other objects of the invention will become apparent upon reading the following detailed description in conjunction with the drawings, in which:

Fig. 2 is a transverse cross sectional view of a portion of the first rotor element as shown in Fig. 1.

Fig. 3 is a schematic view of a group of compressor blades and adjacent structure to illustrate the arrangement of elements by which a magnetic path is completed to produce an alternating magnetic flux in the blades upon rotation of the compressor rotor.

Fig. 4 is a plan view of a magnetic link for use in completing a magnetic path through the compressor blades.

Figure 1:
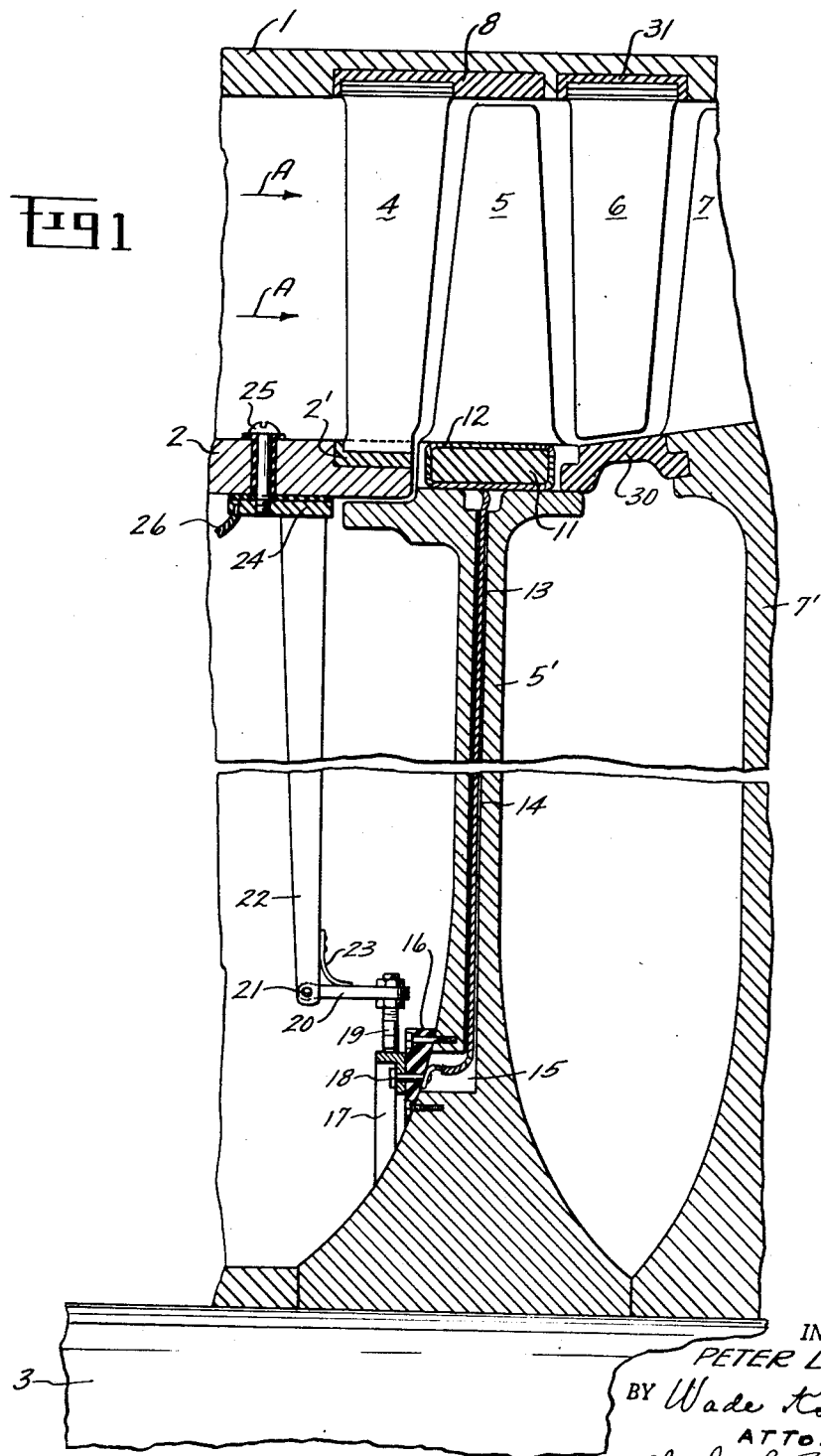
Fig. 1 is a longitudinal cross sectional view taken through a portion of an axial flow air compressor at the air inlet end thereof.

In turbojet engines as used on modern high speed aircraft the air supplied to the combustion chambers is compressed first by being passed through an air compressor located at the forward end of the engine and receiving atmospheric air through a forwardly-opening air inlet. Since the incoming air may be very cold, especially at high altitudes, the metal structure is apt to become chilled with the result that moisture in the air often freezes on the air inlet structure. As long as the ice layers do not impede the flow of air or do not become loose and thus reach the compressor blades, no serious harm is done by ice layers in or adjacent to the air inlet. However it has been found that the first row of stator blades as found on an axial flow compressor are sometime subject to icing. This not only tends to reduce the flow of air to the engine but if the ice is loosened and drawn into the compressor the rapidly moving blades may be broken or damaged. The present invention seeks to eliminate icing of the stator blades at the air inlet of an axial flow air compressor by providing an alternating magnetizing force capable of setting up eddy currents in the stator blades with a corresponding heating effect on the blades.

Reference is now made to Fig. 1 of the drawings which illustrates the first stage of an axial flow air compressor adapted for association with a complete turbojet engine. Reference may also be made to pages 229 to 277 of "Gas Turbine Construction" (1947 edition) by R. Tom Sawyer, which furnishes a complete disclosure of certain Westinghouse Electric Corporation jet engines employing axial flow compressors (note for example Fig. 5 on page 234 and Fig. 1 on page 238). The portion of the compressor shown in Fig. 1 of the present drawings includes an outer casing wall 1 of generally cylindrical form within which is mounted a concentric casing 2 extending forwardly in the complete engine to enclose the engine accessories, such as the fuel pump, the engine starter and the engine generator. These units are adapted to be driven from the main shaft 3 by suitable gearing. It is to be understood that the forward end of the compressor and turbojet engine is toward the left side of Fig. 1, with the incoming atmospheric air entering in the direction of the arrows A through the annular space between the casings 1 and 2. As the air enters the compressor it passes through the spaces between the stator blades 4 and these blades are inclined to bend the air flow so that the air may react properly on the first row of moving rotor blades 5. The inclination of the successive rows of stator and rotor blades produces a sort of herringbone design in a developed plan view, as is well understood. Thus the air leaving the first rotor is partly compressed and is pushed on to the second row of stator blades 6, then to the second row of rotor blades 7 and so on through the successive stages of the compressor, each stage of which boosts the air pressure further. The compressed air finally passes into the combustion chambers to support combustion therein. The excess air and products of combustion then pass through a gas turbine before being discharged from the engine, and the turbine rotor being mounted on the main shaft 3 the air compressor is thus driven at high speed. The speed varies in different engines but 8,000 R. P. M. is not unusual, with smaller sized engines running much faster.

The casings 1 and 2 are preferably made of light weight metals, such as magnesium alloy or aluminum alloy. However the accessory casing 2 is provided with a tight fitting ring 2' of magnetic material having a high degree of permeability and low magnetic retentivity. The first row of stator blades 4 have their inner ends in contacting or adjacent relation to the ring 2' and if desired may be rigidly secured thereto in any convenient manner. At their outer ends the blades 4 are rigidly secured to links or shoes 8, also of magnetic material and extending generally in an axial direction so as to lie close to the tip of the rotor blades 5. It is understood that the blades 4 and 5 are made of a metal having high magnetic permeability as well as the desired strength and hardness. In order to save weight it may be preferable to make the magnetic links 8 in a chevron shape (Fig. 4), arranged so that the two angularly connected portions thereof extend in the same directions as the blades 4 and 5. However for purposes of illustration these linking members are shown as short rectangular bars (Fig. 3). Furthermore these links may be mounted in the wall of casing 1 in any of numerous different ways. As shown in Fig. 2 the recess receiving each link is undercut on one side at 9 to receive a complementally shaped edge portion of the link 8. The opposite edge portion of each link is provided with one or more lugs 8' secured by screws 10 to the wall of casing 1.

As best shown in Fig. 2 each adjacent pair of rotor blades 5 is dovetailed into the rotor wheel 5' and also into a magnet core 11 the whole assembly being rigidly connected, with the same arrangement being repeated clear around the rotor wheel. To provide a powerful magnetizing force to energize the present induction heater, the cores 11 are each wound with a number of turns of insulated wire forming magnetizing coils 12. One end 12' of the wire is grounded to the magnet core, while the other end is continuous with a power lead 13 passing through a conduit-like opening 14 in the rotor wheel 5'. At the inner end the opening 14 extends into a recess 15 extending to the forward side of the wheel 5'. The coils 12 are preferably covered with a layer of plastic insulating material to protect the wires from damage.

Since there will be a number of power leads 13 to be supplied with electric current, an insulating ring 16 and slip ring 17 are securely fastened to the forward side of the rotor wheel 5' (see Fig. 1). The leads 13 connect through screws 18 to the metal slip ring 17 having a smooth outer contact surface. To connect the power source to the slip ring there is provided a brush 19 having a threaded end portion received in an arm 20, and adjustably secured thereto by means of a pair of nuts as shown. The arm 20 is pivoted at 21 to a rigid arm 22 and is spring-urged to slip ring engaging position by a spring member 23. The arm 22 carries an integral base plate 24 secured to the accessory casing 2 by means of one or more screws 25 and the assembly is electrically insulated from the casing by insulating material. A power lead 26 connected to the base plate 24 extends forwardly to connect with a power source, which may be either direct current or alternating current. One terminal of the selected power source is grounded to the engine, so that the grounded terminals 12' of coils 12 will also connect with the power source.

As shown in Fig. 1 the rotor wheel 5' is separated from the next rotor wheel 7' by means of a ring 30 and the complete series of rotors is held tightly together by locking collars mounted on the main shaft 3. The same shaft extends rearwardly to connect with the turbine wheel of the engine, the turbine supplying the rotative effort required to operate the air compressor and the engine accessories. As customary, the second row of stator blades 6 is anchored to the casing 1 by a ring 31 secured in any desired manner to the casing.

For an explanation of the operation of the induction heating apparatus reference is now made to Fig. 3. The magnetic effect which is used to generate eddy currents in the stator blades 4 originates in the magnetic core member 11, which is wound with the magnetizing coil 12. The magnetic circuit including the core member 11 takes in a pair of rotor blades 5, a pair of linking bars 8, a pair of stator blades 4 and a portion of ring 2' between the inner ends of blades 4. At any time this circuit or path is completed, the same pair of stator blades is in a magentic circuit with any one of numerous pairs of rotor blades each secured to an electromagnet 11, 12. Assuming first that the power source applied to the coils 12 is an alternating current, it will be seen that the magnetizing force flowing in the rotor blades will induce a magnetic flux in the bars 8 and stator blades 4 as the rotor blades come opposite to the bars 8. Then as the rotor blades move on farther the magnetic flux in the stator blades will disappear until the next pair of rotor blades approach the bars 8. Thus there will be a rapid rise and fall of magnetic flux in the stator blades which will induce eddy currents therein and cause heating of the metal blades. The heating of the stator blades prevents the formation of ice on the blades and prevents the adherence of ice particles which may reach the blades. The use of alternating current as the magnetizing power source also results in some heating of the rotor blades 5 due to hysteresis loss, this effect being more marked at higher frequencies. Of course the eddy currents induced in the stator blades represents a power loss or extra load on the engine, but it is understood that the power to the coils 12 is turned on only when there is a possibility of ice formation at the compressor inlet. As in other aircraft anti-icing equipment, the power switch may be made responsive to a temperature sensing device to turn on the induction heating apparatus when low temperatures are encountered at the compressor inlet.

For a further description of the operation it is assumed that the magnetizing coils 12 are to be supplied from a direct current source, such as the engine generator. The connections from the coils 12 to the slip ring 17 are made in such a manner that the adjacent cores 11 are oppositely poled, to result in a complete reversal of the magnetic flux in any selected pair of stator blades 4 each time another pair of rotor blades 5 reaches the linking bars 8 connected to the pair of stator blades. Thus if there are eighty-eight blades or vanes 4 on the stator assembly and an equal number of blades 5 on the first rotor assembly, then for each revolution of the rotor there will be forty-four flux reversals in the stator blades. Now assuming further that the compressor is operating at 8000 R. P. M. it will be apparent that there will be close to six thousand flux reversals per second in the stator blades 4, which is more than ample to produce a good heating effect in the stator blades as long as power is available at the electromagnets 11, 12. In practice, an engine generator as found on one type of turbojet engine delivers up to 400 amperes at 30 volts, but if necessary the generator size and power output may be increased to carry the added load of the induction heater. In the present induction heater, whether using alternating current or direct current, the heating effect is dependent on magnetic flux reversals in the blades to be heated. The reversing of magnetic flux is similar in effect to cutting of magnetic flux by a conductor, since both actions affect a metallic conductor in the same way by causing an E. M. F. to appear in the conductor. In the present case the generated E. M. F. appears as eddy currents or Foucalt currents in the stator blades, which cause the stator blades to heat up just as the core of an alternating current transformer is heated due to eddy currents generated therein.

The present induction heater for axial flow air compressors possesses several advantages over ordinary heating devices employing electrical resistance coils or various circulating heating media. Several of the most apparent advantages are as follows:

(1) No wires or other attachments are required on the compressor blades themselves.

(2) The induction of heating currents directly in the metal blades themselves eliminates any heat transfer problems incident to indirect heating, as for instance by the use of heating coils or the flow of hot air diverted from some other part of the turbojet engine.

(3) Uniform distribution of heat obtained in the compressor blades so that any tendency to warp or twist the blades is prevented.

(4) Degree of heating effect may be controlled by regulating the power input to the magnetizing coils.

(5) Very little added weight involved in adapting the heating apparatus to existing compressor designs.

While the drawings illustrate only one embodiment of the invention it should be appreciated that other arrangements may be used to provide magnetic circuits including the stator blades as well as the rotor blades. The arrangement shown is simple in construction, does not weaken the basic compressor structure, does not require magnetizing coils on the blades and also involves a minimum air gap in the magnetic circuits. In order to reduce the magnetic reluctance to a minimum, it may be desirable to make the compressor blades 4 and 5 slightly thicker than in conventional compressors now in use but this will also tend to strengthen the first stage of the compressor. While the induction heater is particularly intended for use on an axial flow air compressor associated with a turbojet aircraft engine, it is clear that it may be equally useful on such a compressor which is merely employed as a source of high pressure air for general purposes or for supercharging conventional piston-type engines.

The embodiments of the invention herein shown and described are to be regarded as illustrative only and it is to be understood that the invention is susceptible to variations, modifications and changes within the scope of the appended claims.

I claim:

1. In an axial flow air compressor for association with a turbojet aircraft engine, a row of stator blades forming inlet guide vanes for said compressor and each being made of a magnetically permeable material, a first rotor element having a row of rotor blades made of a magnetically permeable material adjacent to said row of stator blades and movable relative thereto at a rapid rate of speed during operation of said compressor, means for producing a magnetic flux in said rotor blades, and means comprising linking bars of magnetically permeable material rigidly connected to said stator blades at the outer ends thereof and extending into close proximity to the outer ends of said rotor blades to complete magnetic circuits including said rotor blades, said linking bars and said stator blades.

2. In an axial flow air compressor for association with a turbojet aircraft engine, a row of stator blades forming inlet guide vanes for said compressor and each being made of a magnetically permeable material, a first rotor element having a row of rotor blades made of a magnetically permeable material adjacent to said row of stator blades and movable relative thereto at a rapid rate of speed during operation of said compressor, means for producing a magnetic flux in said rotor blades, and means comprising linking bars of magnetically permeable material rigidly secured to the outer ends of said stator blades and extending generally in an axial direction to complete magnetic circuits including said rotor blades, said linking bars and said stator blades.

3. In an axial flow air compressor for association with a turbojet aircraft engine, a row of stator blades forming inlet guide vanes for said compressor and each being made of a magnetically permeable material, a first rotor element having a row of rotor blades made of a magnetically permeable material adjacent to said row of stator blades and movable relative thereto at a rapid rate of speed during operation of said compressor, an electromagnet extending between the inner ends of each adjacent pair of rotor blades for producing a magnetic flux in said rotor blades, and means comprising linking bars of magnetically permeable material rigidly connected to said stator blades at the outer ends thereof and extending into close proximity to the outer ends of said rotor blades to complete a plurality of magnetic circuits each including an electromagnet, a pair of adjacent rotor blades, a pair of linking bars and a pair of adjacent stator blades.

4. In an axial flow air compressor for association with a turbojet aircraft engine, a row of stator blades forming inlet guide vanes for said compressor and each being made of a magnetically permeable material and having their inner ends connected by a ring of magnetically permeable material, a first rotor element having a row of rotor blades made of a magnetically permeable material adjacent to said row of stator blades and movable relative thereto at a rapid rate of speed during operation of said compressor, an electromagnet extending between the inner ends of each adjacent pair of rotor blades for producing a magnetic flux in said rotor blades, and means comprising linking bars of magnetically permeable material rigidly connected to said stator blades at the outer ends thereof and extending into close proximity to the outer ends of said rotor blades to complete a plurality of magnetic circuits each including an electromagnet, a pair of adjacent rotor blades, a pair of linking bars, a pair of adjacent stator blades and a portion of said ring between the inner ends of said pair of adjacent stator blades.

5. In an axial flow air compressor for association with a turbojet aircraft engine as recited in claim 4, wherein said stator blades and said rotor blades extend in angular relation with respect to the compressor axis and with respect to each other, and wherein said linking bars are each rigidly secured to the outer end of a stator blade and are each of chevron shape in plan.

6. In an axial flow air compressor for association with a turbojet aircraft engine, a circularly disposed row of radial stator blades forming inlet guide vanes for said air compressor and each being made of a magnetically permeable material, a first connecting means of a magnetically permeable material, a first connecting means of a magnetically permeable material extending between the inner ends of adjacent stator blades, a compressor rotor having a row of circularly disposed radial rotor blades made of a magnetically permeable material and situated in adjacent parallelism to the stator blades, a second connecting means of a magnetically permeable material extending between the inner ends of adjacent rotor blades, linking bars of a magnetically permeable material rigidly connected to said stator blades at the outer ends thereof and extending in an axial direction into close proximity to the outer ends of said rotor blades to complete a plurality of magnetic circuits each including a pair of adjacent stator blades, said first connecting means, a pair of linking bars, a pair of adjacent rotor blades and said second connecting means, and means carried on one element of each of said magnetic circuits to produce a magnetic flux therein.

7. In an axial flow air compressor for association with a turbojet aircraft engine, a circularly disposed row of radial stator blades forming inlet guide vanes for said air compressor and each being made of a magnetically permeable material, means including a ring of a magnetically permeable material to anchor the inner ends of said stator blades in fixed relative position, a compressor rotor having a row of circularly disposed radial rotor blades made of a magnetically permeable material and situated in adjacent parallelism to the stator blades, connecting means of a magnetically permeable material extending between the inner ends of adjacent pairs of rotor blades, linking bars of a magnetically permeable material rigidly connected to said stator blades at the outer ends thereof and extending in an axial direction into close proximity to the outer ends of said rotor blades to complete a plurality of magnetic circuits each including a pair of adjacent stator blades, a portion of said ring between the inner ends of said pair of adjacent stator blades, a pair of linking bars, a pair of adjacent rotor blades and said connecting means, and means carried on one element of each of said magnetic circuits to produce a magnetic flux therein.

8. In an axial flow air compressor for association with a turbojet aircraft engine, a circularly disposed row of stator blades forming inlet guide vanes for said air compressor and each being made of a magnetically permeable material, means including a ring of a magnetically permeable material to anchor the inner ends of said stator blades in fixed relative position, a compressor rotor having a row of circularly disposed radial rotor blades made of a magnetically permeable material and situated in adjacent parallelism to the stator blades, an electromagnet including a core of a magnetically permeable material extending between the inner ends of adjacent pairs of rotor blades for producing a magnetic flux, and linking bars of a magnetically permeable material rigidly connected to said stator blades at the outer ends thereof and extending in an axial direction into close proximity to the outer ends of said rotor blades to complete a plurality of magnetic circuits each including an electromagnet core, a pair of adjacent rotor blades extending radially from said core, a pair of linking bars, a pair of adjacent stator blades connected to said pair of linking bars and a portion of said ring between the inner ends of said pair of adjacent stator blades.

PETER L. GILL.

REFERENCES CITED

The following references are of record in the file of this patent:

FOREIGN PATENTS

| Number | Country | Date |
| --- | --- | --- |
| 430,752 | Germany | June 22, 1926 |
| 430,753 | Germany | June 23, 1926 |

OTHER REFERENCES

Gas Turbine Construction (1947 edition), R. Tom Sawyer, pages 229–277.